Dec. 15, 1959    A. A. HEMPHILL ET AL    2,917,742
RADIO COMPASS EMPLOYING LOOP SENSING DEVICE
Filed Feb. 17, 1956    3 Sheets-Sheet 1
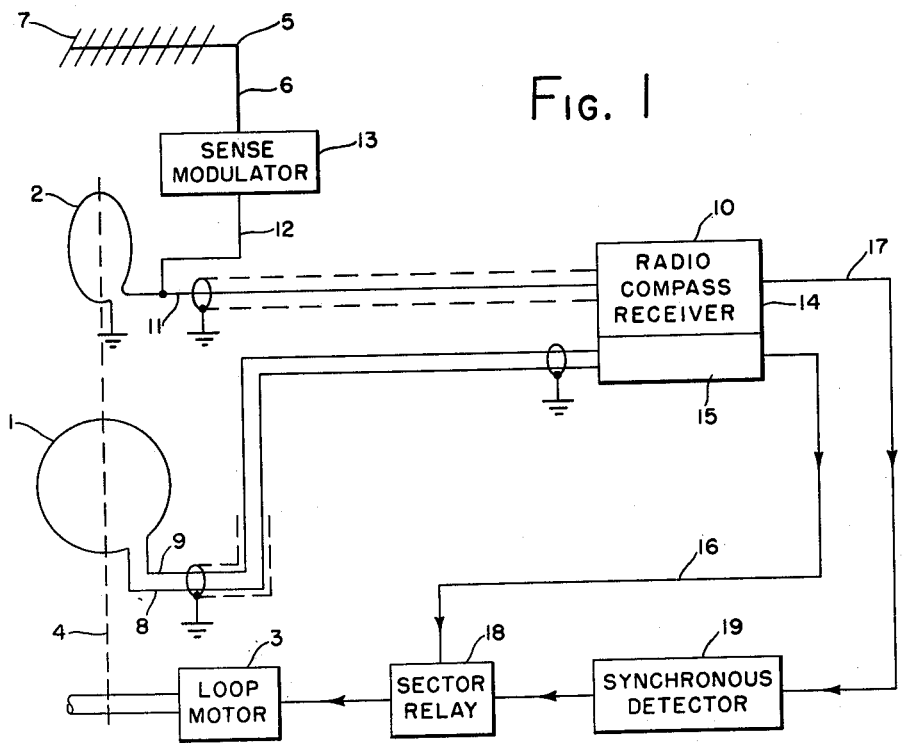
FIG. 1
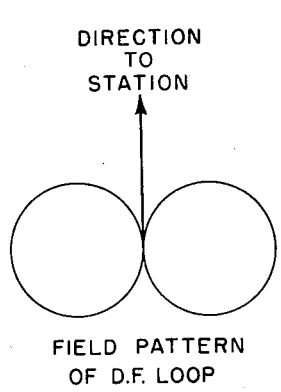
FIELD PATTERN
OF D.F. LOOP
FIG. 2
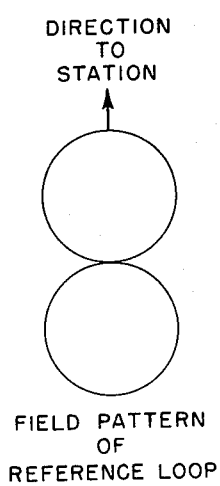
FIELD PATTERN
OF
REFERENCE LOOP
FIG. 3
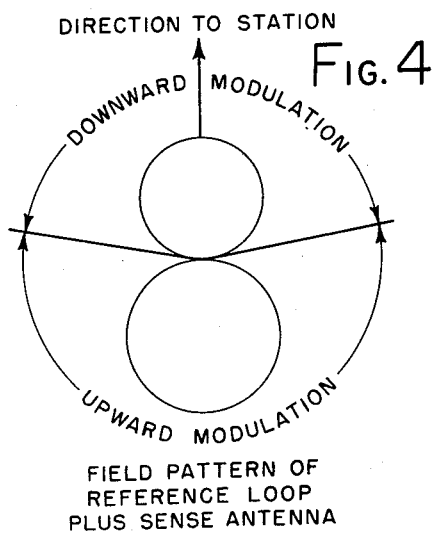
FIELD PATTERN OF
REFERENCE LOOP
PLUS SENSE ANTENNA
INVENTORS
ALFRED A. HEMPHILL
JOHN M. TEWKSBURY
BY
Killman and Keist
ATTORNEYS Dec. 15, 1959  A. A. HEMPHILL ET AL  2,917,742
RADIO COMPASS EMPLOYING LOOP SENSING DEVICE
Filed Feb. 17, 1956  3 Sheets-Sheet 2

*INVENTORS*
ALFRED A. HEMPHILL
JOHN M. TEWKSBURY
BY
*Killman and Kerst*
ATTORNEYS United States Patent Office 2,917,742
Patented Dec. 15, 1959

2,917,742
RADIO COMPASS EMPLOYING LOOP SENSING DEVICE

Alfred A. Hemphill, Baltimore, and John Merle Tewksbury, Lutherville, Md., assignors to Bendix Aviation Corporation, Towson, Md., a corporation of Delaware Application February 17, 1956, Serial No. 566,126
5 Claims. (Cl. 343—117)

This invention relates to radio compass systems in which a direction finding loop is automatically driven to a position in which a null portion of its response pattern is lined up with the direction from which a signal is received.

Presently used radio compass systems make use of an antenna having a non-directional pattern to supply carrier to the radio receiver. This carrier is then modulated by a signal from a loop antenna which has a directional pattern and the resulting modulation causes a loop driving motor to drive the loop until a null of its pattern is lined up with the received signal. The phase relationship between the outputs of the two antennas is used to prevent ambiguous positioning of the loop.

While this arrangement operates satisfactorily, the antennas have been a problem when the system is used in modern high speed aircraft where no protruding elements can be tolerated. The direction finding loop was formerly a relatively large device exposed in the slip stream. In various stages it was streamlined, reduced in size by the use of an iron core and finally brought down within the skin of the aircraft by the use of the magnetic loop antenna as described in U.S. patent application Ser. No. 264,717 for "Magnetic Antenna Systems" filed January 2, 1952, in the name of Alfred A. Hemphill; which is now U.S. Patent No. 2,740,113, issued March 27, 1956. This antenna is housed in a depression formed in the surface of the aircraft and the depression is closed by a plastic cover flush with the skin of the aircraft.

No such evolution has been possible for the sense antenna (the antenna having a non-directional pattern), however, and it has remained in the slip stream where it has kept the shape of a strut wire. It has not been possible to make much reduction in its length without sacrificing so much of its response as to make it ineffective for its purpose.

It is an object of this invention to provide an effective radio compass system for aircraft use in which there are no antennas protruding into the slip stream.

It is a further object of the invention to provide such a system in which all antennas are housed in a depression within the surface of the aircraft.

The objects and advantages of the invention are realized by a system using a reference loop and a small sense antenna in addition to the direction finding loop. The reference loop is positioned with its plane at right angles to that of the direction finding loop. The sense antenna is a strip of foil extending upward from the reference loop to the plastic cover of the recess housing the loops, and terminates in a top loading pattern of foil on the inner surface of the cover.

A preferred form of the invention is disclosed in the following specification and the accompanying drawing, in which:

Fig. 1 is a schematic block diagram of a system embodying the invention;

Fig. 2 is a diagram of the field pattern of a direction finding loop;

Fig. 3 is a diagram of the field pattern of a reference loop of the type utilized in the system of Fig. 1;

Fig. 4 is a diagram of the field pattern of the reference loop of Fig. 1 as modified by the action of the sense antenna of Fig. 1;

Figure 5:
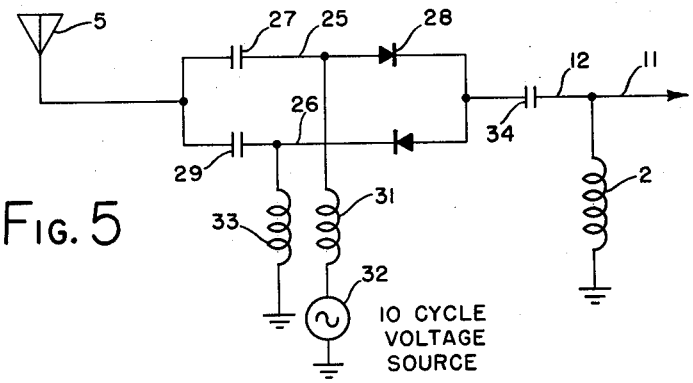
Fig. 5 is a schematic diagram of the sense modulator of the system of Fig. 1.

Turning now to Fig. 1 of the drawing for a more detailed explanation of the invention, the system there shown comprises a direction finding (D.F.) loop 1, which is preferably of the type shown in the above mentioned application Ser. No. 264,717. Mounted directly above the first loop, but with its axis at right angles thereto, is a second loop of the same type, indicated at 2. The two loops are rotated in unison by a loop motor 3, through a mechanical linkage indicated by the dashed line 4. Located in the vicinity of the reference loop is a sense antenna 5, composed of a vertical portion 6 and a horizontally extending portion 7. The latter part is in the form of a grid and acts as a top loading element for the vertical part 6. This form of antenna is readily adapted to being formed of foil, with the vertical portion extending up the side of the recess in which is mounted the pair of loops 1 and 2, and the horizontally extending portion secured to the inner surface of the cover of the recess. Although the two loops are shown as vertically separated, in actual practice they may be wound on the same core, such as the core 15 of the above mentioned application.

The terminals of the D.F. loop 1 are connected by leads 8 and 9 to the radio compass receiver 10 in the conventional manner. A terminal of the reference loop 2 is connected by a lead 11 to the usual sense antenna input terminal of the receiver. The loop 2 is also connected by a conductor 12 and a sense modulator 13 to the sense antenna 5. The sense modulator, which will be more fully described later, is a switching device, employing a pair of diodes to switch the output of the sense antenna into and out of an additive relationship with the output of the reference antenna at a rate of about ten cycles per second.

The radio compass receiver is shown as consisting of two portions 14 and 15. To the portion 14 the composite output of the antennas 2 and 5 is applied, and to the portion 15 is applied the output of the loop 1. The output of the portion 15 is applied by way of a conductor 16 to a sector relay 18, and the output of the portion 14 is applied by way of a conductor 17 to a synchronous detector 19, the output of the latter being applied to the sector relay 18. The output of the sector relay is applied to and controls the operation of the loop motor 3.

Figure 8:
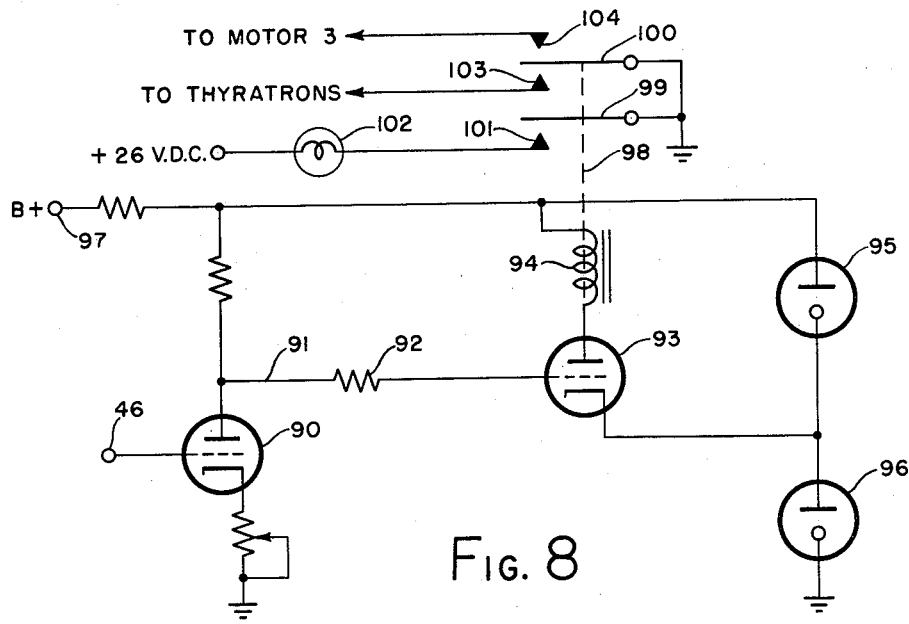
Fig. 8 is a schematic diagram of the sector relay circuit of Fig. 1.

In the operation of the system of Fig. 1, the D.F. loop 1 will have a pattern of the familiar Figure 8 type as shown in Fig. 2. As is inherent in loop antennas, the energy of one lobe of this pattern is 180° out of phase with that of the other lobe. The signal provided by this loop is utilized in the portion of the receiver indicated by the numeral 15 in the conventional manner as described in the textbook "Wireless Direction Finding" by Keen, fourth edition, published in 1947 by Iliffe and Sons Ltd., London England, pages 887 to 893 inclusive, to energize the loop motor 3 and cause it to rotate the loop until one of the nulls of its pattern is lined up with the direction from which the signal is being received. However, since this pattern has two nulls, the resulting positioning of the loop would be ambiguous and the remainder of the system has the function of resolving the ambiguity.

Since the loop 2 is fixed with respect to the loop 1, has the same type of Figure 8 response pattern, and has its axis normal to that of the loop 1, its response will be a maximum when the loop 1 is so positioned as to provide a null output. This is indicated in Fig. 3.

By the operation of the sense modulator 13, however, the omni-directional response of the sense antenna 5 is periodically combined with that of the loop 2, causing it to be either increased or decreased in amplitude, depending on whether the two responses are in phase or out of phase. As shown in Fig. 4, the combined response pattern of antennas 2 and 5 is a modified Figure 8, with one lobe larger than the other. In the sector in which the responses are out of phase, the lobe is smaller than the corresponding lobe of the loop 2, while in the other sector it is larger.

Figure 9:
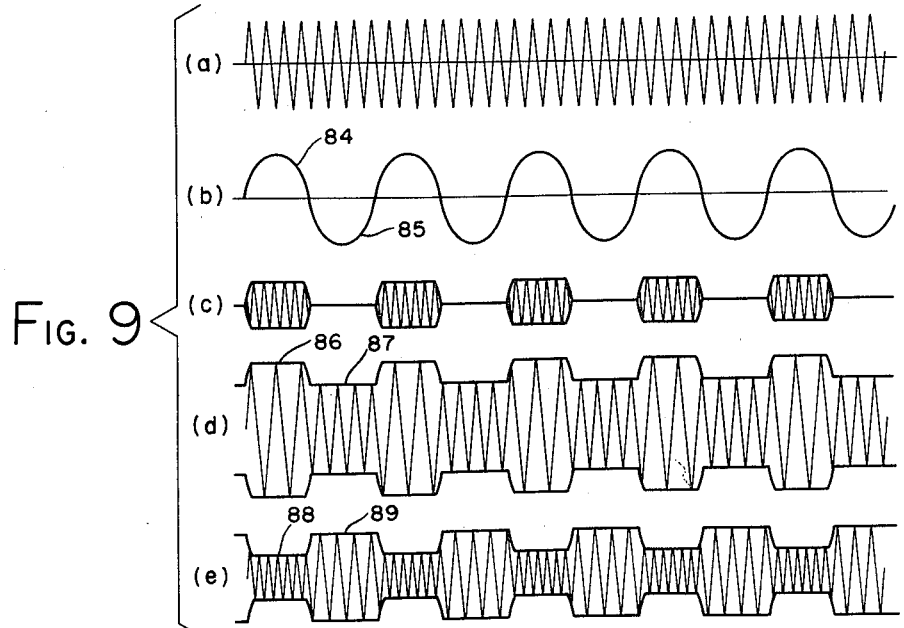
Fig. 9 is a group of curves, drawn to the same time base, depicting waveforms existing at various points in the circuit of Fig. 1.

The curves of Fig. 9 illustrate the waveforms of the system described. Curve (a) is the unmodulated output of the reference loop 2, which is the radio frequency signal of the transmitting station. The curve (b) is the sense modulator voltage, having a frequency of, for example, ten cycles per second. During each positive excursion of this voltage the sense antenna output is combined with that of the reference loop and during each negative excursion the two antennas are effectively disconnected. The output of the sense modulator is illustrated by curve (c) and the output of the portion 14 of the receiver by the curves (d) and (e). The curve (d) illustrates the output when the outputs of the antennas 2 and 5 are in phase, while the curve (e) illustrates the result when the two outputs are in phase opposition. The output conforms to the curve (d) when the lower lobe of the pattern of Fig. 4 is pointed toward the station, and to the curve (e) when the upper lobe is pointed toward the station. It will be noted that in curve (d) the portions of the waveform which coincide in time with the positive excursions of the waveform of curve (b) are of greater amplitude than the remainder of the wave, while in curve (e) they are of less amplitude.

The synchronous detector 19 utilizes the same voltage that actuates the sense modulator to detect that porion of the output of the loop 2 which is modulated by the output of the antenna 5. The result is a D.C. voltage which is either positive or negative, depending on whether its input is of the form of curve (d) or (e) of Fig. 9. This voltage, fed to the sector relay 18 will, if positive, energize the loop motor 3 to rotate the loops in a preselected direction, which may be, for example, clockwise, and which is always the same. This action continues until the null of the reference loop pattern is in line with the transmitting station, at which time the sense modulation drops to zero. The time constant of the synchronous detector, however, which is dictated by the integration requirements of that circuit, maintains the output of the synchronous detector for a short period of time until the loops have rotated far enough that any corrective action by the conventional direction finder circuits would rotate the loops in a direction to bring the proper null of the D.F. loop into coincidence with the transmitting station. Then the sector relay drops out, transferring control to the conventional control circuits. As long as the synchronous detector continues to develop minus or zero voltage, the compass will operate in the conventional manner.

One form of the sense modulator 13 is shown in Fig. 5. As shown, the sense antenna 5 and the loop 2 are joined by a circuit having two parallel branches 25 and 26. In the branch 25 are serially connected a condenser 27 and a diode 28, the junction being made with the anode terminal of the diode. In the branch 26 are serially connected a condenser 29 and a diode 30, the junction being made with the cathode terminal of the diode. The junction of the elements of the branch 25 is connected by way of a radio frequency choke 31 to a source 32 of 10 cycle voltage. The junction of the elements of the branch 26 is connected by way of a radio frequency choke 33 to ground. A coupling condenser 34 couples the modulator, by way of the lead 12 to the reference loop 2. The condensers 27 and 29 are blocking condensers.

In the operation of the circuit just described, the negative going excursions of the voltage from the source 32 raises the impedance of the diodes to a level such that they are substantially non-conductive, thus effectively disconnecting the antenna 5 from the loop 2. The positive going excursions, however, lower the impedance of the diodes to a negligible value, substantially effecting a direct connection between the two antennas.

Figure 6:
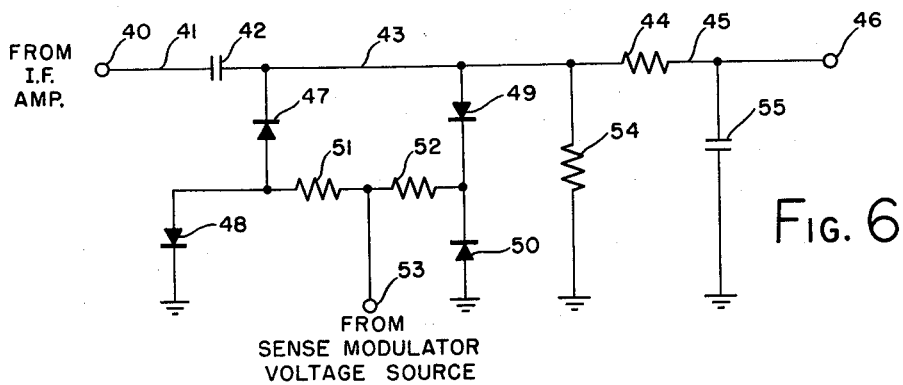
Fig. 6 is a schematic diagram of the synchronous detector of the system of Fig. 1.

Fig. 6 illustrates one form of synchronous detector which may be used in the system of Fig. 1. This form uses the output of the intermediate frequency portion of the receiver which is obtained from the terminal 40. This terminal is connected by way of a lead 41, a coupling capacitor 42, a lead 43, a resistor 44, and a lead 45 to a terminal 46. Extending between the lead 43 and ground is a pair of diodes 47 and 48 in series, with their anodes joined. Also connected between the lead 43 and ground is a second pair of diodes 49 and 50, with their cathodes joined. Connected between the junction of the diodes 47 and 48 and the junction of the diodes 49 and 50 is a pair of serially connected resistors 51 and 52. The junction of these resistors is connected to a terminal 53 to which is applied a voltage synchronized with the voltage of the source 32. Also connected between the lead 43 and ground is a resistor 54. A condenser 55 is connected between the lead 45 and ground.

In the operation of this circuit, the application of a positive excursion of the ten cycle voltage from the terminal 53 reduces the impedance of the diode 48 to a low value and clamps the junction of diodes 47 and 48 to ground potential. At the same time the diodes 49 and 50 are rendered substantially non-conductive. This results in the detection of the positive going excursions of the intermediate frequency input. The amplitude of the resulting envelope will be of greater or lesser magnitude than that of the remainder of the input waveform depending on whether or not it has the form of the curve (d) or (e).

The application of the negative going excursions of the voltage from terminal 53 renders the diodes 47 and 48 substantially non-conductive and reduces the impedance of the diode 50 to a low value, clamping the junction of diodes 49 and 50 to ground potential. This results in the detection of the negative going excursions of the input wave form. The time constant of the combination of resistor 44 and condenser 55 is of the order of several seconds with the result that the positive envelope detected during the positive half cycles of the voltage from terminal 53 and the negative envelope detected during the negative half cycles of that voltage are integrated to produce a positive or negative output depending on whether the input has the form of curve (d) or (e). When the upper lobe of the pattern of Fig. 4 is directed toward the station the input will have the form of curve (c) and the output at point 46 will be negative. When the lower lobe of the pattern is directed toward the station the input will have the form of curve (d) and the output at point 46 will be positive.

Figure 7:
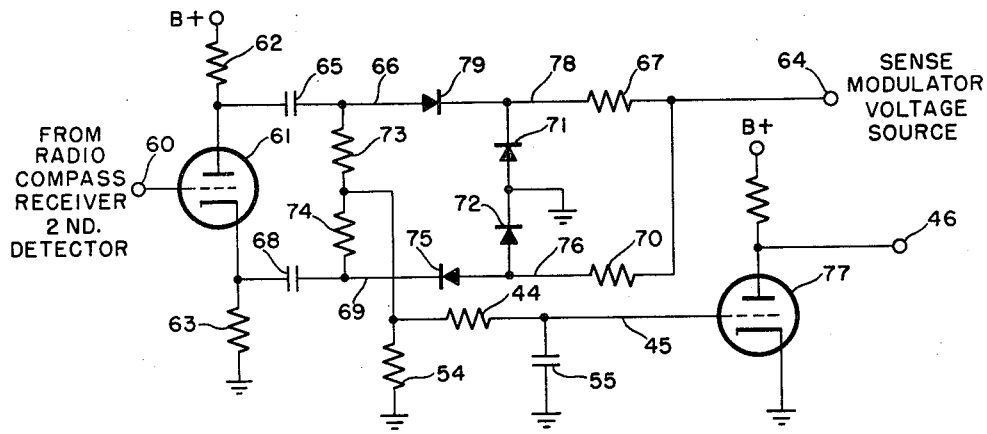
Fig. 7 is an alternate form of the synchronous detector shown in schematic form.

Fig. 7 illustrates a form of synchronous detector operating on an audio input. To the input terminal 60 is applied the output of the second detector of the receiver. This terminal is connected to the control grid of a tube shown as a triode. Load resistors 62 and 63 are provided in the anode and cathode circuits, respectively, of this tube. The anode is connected to a terminal 64 by way of a coupling capacitor 65, a lead 66, a diode 79, a lead 78 and a resistor 67. The cathode is connected to this terminal by way of a coupling capacitor 68, a lead 69, a diode 75, a lead 76 and a resistor 70. The terminal 64 has applied to it a voltage synchronized with the voltage from source 32 of Fig. 5.

Connected between the leads 78 and 76 is a serially connected pair of diodes 71 and 72, the anode of the diode 71 being connected to the cathode of the diode 72. The junction of these diodes is grounded. Also connected between the leads 66 and 69 is a pair of serially connected resistors 73 and 74 with their junction point connected to the same terminating network as found in the circuit of Fig. 6. The cathodes of the diodes 71 and 79 are joined, as are the anodes of the diodes 72 and 75.

In the operation of the circuit of Fig. 7, each positive half cycle of the voltage applied at the terminal 64 renders the diodes 71 and 79 substantially non-conductive and reduces the impedance of the diode 72 to a low value, clamping the junction of diodes 72 and 75 to ground potential.

Each negative half cycle of this voltage renders the diodes 72 and 75 substantially non-conductive and reduces the impedance of the diode 71 to a low value, clamping the junction of diodes 71 and 79 to ground potential.

The output of the second detector of the receiver is applied to the input terminal 60. This will be the envelope of either the waveform (d) or (e). If it is (d) the portions of the envelope corresponding to the positive lobes of the waveform (b) applied to terminal 64 will be of greater amplitude than those corresponding to the negative lobes of waveform (b). Taking the first cycle of waveform (b) of Fig. 9 as an example, during the positive lobe 84 thereof, the junction of diodes 72 and 75 will be clamped to ground and the diodes 71 and 79 will be non-conductive. The portion 86 of the envelope of waveform (d), applied to the grid of tube 61, will cause the right hand plate of condenser 68 to become negative in potential. But the potential at diode 75 will be positive which is in the wrong sense to produce conduction. Since the diode 71 is non-conductive, there will be a zero output from the circuit.

During the negative lobe 85 of the waveform (b) the diodes 71 and 79 are rendered conductive and the junction of diodes 71 and 79 clamped to ground. The diodes 72 and 75 are rendered substantially non-conductive. The portion 87 of the envelope of waveform (d) will cause the right hand plate of condenser 65 to go negative and put a positive potential on the plate of diode 79. The voltage output at the junction of resistors 73 and 74 will be negative. There will be no output from diodes 72 and 75 since they are open. The resultant for waveform (d) is a negative output.

If the waveform (e) is applied to the input, rather than waveform (d), the portion 88 of the wave will cause the right hand plate of condenser 68 to become positively charged and a negative potential will exist at the plate of diode 75. The current flow will produce a positive voltage at the junction of resistors 73 and 74. During the negative lobe of waveform (b) the portion 89 of waveform (e) will cause the right hand plate of condenser 65 to be positively charged and a negative potential to exist at the plate of diode 79. The diode will not conduct under such circumstances and since the diodes 72 and 75 are open there will be no output from the circuit. The net circuit output will then be positive. Since the sense of the output of the detector of Fig. 7 is opposite to that of Fig. 6 for the same input, a phase inverting stage is inserted between the lead 45 and the terminal 46.

It should be understood, however, that the selection of detector output sense for the operation of the sector relay is a matter of conveniences.

In either form of the synchronous detector which has been discussed the elements 44 and 55 have a time constant of several seconds, for example, five. This integrates the output to provide a fairly steady D.C. voltage.

The output of the synchronous detector is applied at the terminal 46 to the input of the sector relay 18, shown in detail in Fig. 8. The circuit comprises a tube 90, directly coupled by way of a connection 91, including a resistor 92, from the anode circuit of tube 90 to the control grid of a relay tube 93 having a relay coil 94 in its anode circuit. A pair of gas voltage regulator tubes 95 and 96 are connected in series between the positive terminal 97 of a source of plate supply voltage and ground. The cathode of tube 93 is connected to the junction of the regulator tubes.

A relay armature 98 controls a pair of grounded switch arms 99 and 100. The arm 99 in its downward position makes contact with a contact element 101 to close a circuit to an indicating light 102. The arm 100 operates between two contact elements 103 and 104. The lower element 103 is in circuit with the thyratrons of the conventional direction finder motor control circuit of the above mentioned text book. The upper element 104 is in circuit with the field coil of the motor 3 in such a sense as to cause the motor to rotate to drive the loops in a predetermined direction, say clockwise, when the element 104 is grounded.

In the operation of the sector relay of Fig. 8 the rest position of the relay is the position in which the switch arm 100 is in contact with the element 104. When a zero or negative input is applied to the grid of tube 90, a positive signal is applied to the grid of tube 93, the tube conducts strongly and the relay is in its actuated state with the thyratrons in control and the light 102 lighted. When a positive signal from the output of the synchronous detector is applied to the grid of the tube 90, the signal applied to the grid of tube 93 becomes negative, the output of tube 93 is reduced or arrested and the relay moves to its position of rest.

In this position the contact element 104 is grounded and the motor 3 is energized to rotate the loops in a clockwise direction. When the loops have rotated until the output of the synchronous detector drops to zero the relay will again be energized and the thyratrons of the normal direction finder control system will take over. Due to the long time constant of the elements 44 and 55 of the synchronous detector, however, this will not occur until the loops have turned to a position well within the proper sector of the received signal.

The following component values have been successfully employed in a system embodying the invention. It is to be understood, however, that they are given by way of illustration only and do not limit the scope of the invention.

Sense modulator:
    Condensers 27 and 29 _____ .01 µfd.
    Condenser 34 _____ .1 µfd.
    Coils 31 and 33 _____ 20 mh.
    Diodes 28 and 30 _____ Silicon diodes.
    Voltage source 32 _____ 15 v., 10 c.p.s.

Synchronous detector, Fig. 6:
    Condenser 42 _____ 100 µµfd.
    Condenser 55 _____ 1. µfd.
    Diodes 47, 48, 49 and 50 _____ Silicon diodes.
    Resistors 51 and 52 _____ 10,000 ohms.
    Resistor 54 _____ 560,000 ohms.
    Resistor 44 _____ 5.6 megohms.

Synchronous detector, Fig. 7:
    Condensers 65 and 68 _____ .12 µfd.
    Resistors 73 and 74 _____ 560,000 ohms.
    Resistor 54 _____ 1 megohm.
    Resistors 67 and 70 _____ 10,000 ohms.
    Diodes 71, 79, 72 and 75 _____ Silicon diodes.

Relay circuit:
    Resistor 92 _____ 1. megohm.
    Tube 93 _____ 1/2AT7.
    Tubes 95 and 96 _____ OB2.
    B+ _____ 300 v.
    Voltage on cathode of tube 93 _____ 108 v.

What is claimed is:

1. A radio compass system comprising a first loop antenna, means responsive to the output of said antenna to rotate the same until a null portion of its response pattern is in line with the direction from which the received signal originated, a second loop antenna mounted to rotate with said first loop, with its axis normal with respect to the axis of said first loop, a sense antenna having a non-directional response characteristic, means modulating the output of said second loop antenna with the output of said sense antenna at regular intervals, means comparing the amplitudes of said modulated and unmodulated portions of said modulated output and deriving from said comparison a control voltage, and means responsive to a predetermined sense of said control voltage to assume control of the rotation of said loop antennas and to rotate the same.

2. A radio compass system comprising a pair of loop antennas mounted with their axes normal to each other, means for rotating said antennas in unison, means responsive to the output of one of said antennas to rotate said antennas until a null point of the response pattern of said one antenna is in line with the direction from which the received signal originated, a sense antenna having a non-directional response pattern, switching means operable in a first condition to modulate the output of said sense antenna with the output of the other of said loop antennas and in a second condition to interrupt said modulating action, means driving said switching means in alternation between said conditions at a regular rate, means comparing the amplitudes of the modulated and unmodulated portions of said output of said other loop and deriving from said comparison a control voltage the sense of which is a function of the phase relationship between the outputs of said sense antenna and said other loop, and means responsive to a predetermined sense of said control voltage to assume control of the rotation of said loop antennas and to rotate the same.

3. A radio compass system comprising a pair of loop antennas mounted with their axes normal to each other, means for rotating said antennas in unison, means responsive to the output of one of said antennas to rotate said antennas until a null point of the response pattern of said one antenna is in line with the direction from which the received signal originated, a sense antenna having a non-directional response pattern, a switching means having two states, in the first of which it applies the output of said sense antenna to the output of the other of said loop antennas and in the second of which it interrupts said application, a source of alternating current potential having a low audio frequency, means applying potential from said source to said switching means to cause it to assume the first of said states during excursions of said potential of one sense and the second state during excursions of said potential of the opposite sense, means comparing the amplitudes of the outputs of said switching means during said two states and deriving from said comparison a control voltage the sense of which is a function of the relative amplitudes of said outputs during said states, and means responsive to a predetermined sense of said control voltage to assume control of the rotation of said loop antennas and to rotate the same.

4. A radio compass system comprising a pair of loop antennas mounted with their axes normal to each other, means for rotating said antennas in unison, means responsive to the output of one of said antennas to rotate said antennas until a null point of the response pattern of said one antenna is in line with the direction from which the received signal originated, a sense antenna having a non-directional response pattern, a switching circuit connecting said sense antenna and the other of said loop antennas, said switching circuit comprising variable impedance means responsive to the application thereto a potential of one sense to interpose a very high impedance to the output of said sense antenna and responsive to the application of a potential of the opposite sense to interpose a low impedance to said output of said sense antenna, a source of alternating current potential having a low audio frequency, means applying potential from said source to said variable impedance means, a synchronous detector, means applying potential from said source to said synchronous detector, means applying the output of said other of said loop antennas, as modulated by the output of said switching means, to said detector, said detector being responsive to excursions of said potential of one sense to rectify the excursions of said antenna output of a particular sense and to excursions of said potential of the opposite sense to rectify the excursions of said antenna output of the opposite sense, means integrating said rectified outputs and means responsive to said integrated output of a particular sense to assume control of the rotation of said loop antennas and to rotate the same.

5. A radio compass system comprising a pair of loop antennas mounted with their axes normal to each other, means for rotating said antennas in unison, means responsive to the output of one of said antennas to rotate said antennas until a null point of the response pattern of said one antenna is in line with the direction from which the received signal originated, a sense antenna having a non-directional response pattern, a switching circuit connecting said sense antenna and the other of said loop antennas, said switching circuit comprising variable impedance means responsive to the application thereto of a potential of one sense to interpose a very high impedance to the output of said sense antenna and responsive to the application of a potential of the opposite sense to interpose a low impedance to said output of said sense antenna, a source of alternating current potential having a low audio frequency, means applying potential from said source to said variable impedance means, a synchronous detector, means applying to said synchronous detector an alternating current potential synchronized with said potential of said source, means applying the output of said other of said loop antennas, as modulated by the output of said switching means, to said detector, said detector being responsive to excursions of said potential of one sense to rectify the excursions of said antenna output of a particular sense and to excursions of said potential of the opposite sense to rectify the excursions of said antenna output of the opposite sense, means integrating said rectified outputs and means responsive to said integrated output of a particular sense to assume control of the rotation of said loop antennas and to rotate the same.

References Cited in the file of this patent

UNITED STATES PATENTS

| | | |
|---|---|---|
| 2,247,294 | Goble | June 24, 1941 |
| 2,314,029 | Bond | Mar. 16, 1943 |
| 2,360,810 | Carlson | Oct. 17, 1944 |